United States Patent [19]

Galbrecht

[11] Patent Number: 5,056,102
[45] Date of Patent: Oct. 8, 1991

[54] GETTER ASSEMBLY

[75] Inventor: Craig A. Galbrecht, Lino Lakes, Minn.

[73] Assignee: Honeywell Inc., Minneapolis, Minn.

[21] Appl. No.: 351,979

[22] Filed: May 15, 1989

[51] Int. Cl.⁵ .............................................. H01S 3/097
[52] U.S. Cl. ........................................ 372/87; 372/59; 372/65; 372/94; 313/549; 313/558; 356/350
[58] Field of Search .................. 372/59, 87, 94, 65; 313/549, 558; 356/350

[56]  References Cited

U.S. PATENT DOCUMENTS

| 4,115,004 | 9/1978 | Hutchings et al. | 356/106 LR |
| 4,257,015 | 3/1981 | Ljung | 356/350 |
| 4,530,854 | 7/1985 | Meyerhoff | 427/162 |
| 4,670,691 | 6/1987 | Podgorski | 313/549 |
| 4,740,985 | 4/1988 | Podgorski | 372/87 |

FOREIGN PATENT DOCUMENTS

| 0128230 | 12/1984 | European Pat. Off. | 356/350 |
| 0218146 | 9/1988 | Japan | 313/549 |
| 2091481 | 7/1982 | United Kingdom | 313/549 |
| 2185846 | 7/1987 | United Kingdom | 356/350 |

Primary Examiner—Georgia Eps
Attorney, Agent, or Firm—Robert A. Pajak

[57] ABSTRACT

Disclosed is a getter assembly for a gas discharge device in which the getter assembly consists of a snap-ring wherein the snap-ring includes a depression or trough for holding the getter material. The getter assembly is intended to be placed in an opening in a gas discharge device providing the function of a getter.

6 Claims, 2 Drawing Sheets

5,056,102

GETTER ASSEMBLY

BACKGROUND OF THE INVENTION

The present invention relates to a getter assembly for a gas discharge device.

Alkaline-earth materials, commonly barium, strontium, calcium, and titanium, may be used for "getters" which scavenge residual contaminant gases from rare earth gases such as helium and neon, as is known in the art. These getter materials are useful in the operation of gas discharge devices such as lasers which generally require a contamination-free mixture of rare earth gasses, e.g., helium and neon, to promote longer life.

In gas discharge devices employed as ring laser angular rate sensors, hereinafter referred to as ring laser gyros, a mechanically and thermally stable block provides a gas discharge cavity comprised of a plurality of interconnected tunnels and adjacent chambers. The gas discharge cavity provided by the laser block is evacuated and filled with helium and neon under low pressure. Commonly, two anodes and one cathode are symmetrically positioned along the optical closed-loop path in communication with the tunnels to provide a pair of ionization current paths, thereby creating counter-propagating laser beams. The gas discharge cavity of such ring laser gyros usually includes getter material for removing impurities from the helium-neon gas mixture.

In some ring laser gyros, the getter material is introduced in the gas discharge cavity by way of a getter assembly constructed of a getter pan suspended from a snap-ring via an extension member. The extension member is intended to advantageously position the getter pan assembly in close proximity to selected gas discharge cavity walls.

The getter pan is generally comprised of a metallic ring. The metallic ring generally includes a trough or depression therein which is filled with getter material, thereby providing what is referred to as the getter pan. In turn, the getter pan is secured to the snap-ring by welding one end of the extension member to the getter pan, and the other end of the extension member is welded to the snap-ring. Alternatively, the getter pan may be welded directly to the snap-ring.

The snap-ring resembles common fastener-type snap-rings. Two holes symmetrically located at the ends of the snap-ring are provided to facilitate positioning of the getter assembly within one of the aforementioned chambers within the gyro block. A tool similar to a needle-nosed pliers is inserted into the holes of the snap-ring and operated to compress the snap-ring. In turn, the snap-ring with getter pan is positioned inside of a chamber within the gyro laser block. The tool is then removed which in turn allows the snap-ring to place the extremities thereof in outward tension against the gas discharge cavity walls thereby holding the getter assembly firmly in position within the gas discharge chamber.

After the injection of a helium-neon gas mixture into the laser block, the gas discharge cavity is closed off at its gas-filling pinch tube, leaving the getter assembly inside the gas discharge cavity chamber. Next, the getter pan is inductively heated by means of external coils. The heat transferred from the getter pans, in turn, heats the getter material residing therein to its flash point. Flashing the getter effectively vaporizing the getter material and results in a deposition of a film of activated getter material on portions of the gas discharge cavity walls, particularly in the chamber holding the getter assembly.

The getter assembly described above has several disadvantages. After the getter has been flashed, particulate getter material from the getter pan may also shed from the pan due to shock and/or vibration encountered by the ring laser gyro. This particulate getter matter contaminates the cavity and reduces the useful life of the laser. Also, shock and vibration may cause the getter pans to oscillate, which stresses the weld joints at the ends of the extension member. Further, getter pan vibration oscillations stir up the gas mixture in the cavity which may impact bias instability in ring laser gyros.

SUMMARY OF THE INVENTION

It is an object of the present invention to provide an improved method for introducing getter material into a gas discharge device.

It is a further object to provide an improved method for introducing getter material into a ring laser gyro.

In the present invention, a snap-ring is provided with an appropriate trough or depression to accommodate getter material therein.

DETAILED DESCRIPTION OF THE INVENTION

Figure 1:
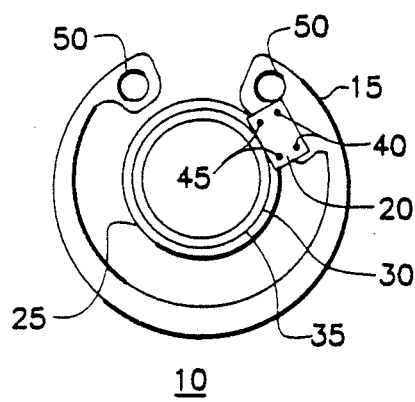
FIG. 1 is a schematic diagram of a getter assembly of the prior art.

FIG. 1 illustrates a getter assembly of the prior art. Therein, getter assembly 10 is comprised of a snap-ring 15, a metallic extension member 20, and a getter pan 25. Snap-ring 15 includes holes 50, for positioning of getter assembly 10 in the gas discharge cavity in a manner as already described. Getter pan 25 is constructed of a metallic material, and includes a trough or depression 30 to hold getter material 35 deposited therein. An example of getter pan 25 may be one having a depression 30 in order of 0.03 inches or less in depth, and have an outside diameter in the order of 0.2 inches. Getter material 35 may be comprised of barium or any other suitable alkaline-earth element for removing contaminant gasses from the gas discharge cavity.

One end of extension member 20 is welded to snap-ring 15 at weld joints 40, and the other end of extension member 20 is welded to getter pan 25 at weld joints 45 such that getter pan 25 is approximately concentric with snap-ring 15. In the prior art, getter pan 25 has alternatively been made to include extension member 20 in a unitary structure which in turn is welded to snap ring 15. Although not shown in FIG. 1, extension member 20 may be made with a portion thereof perpendicular to the plane of snap-ring 25 and/or snap ring 15 to facilitate getting the getter pan close to particular gas discharge cavity wall portions as aforesaid.

Figure 2:
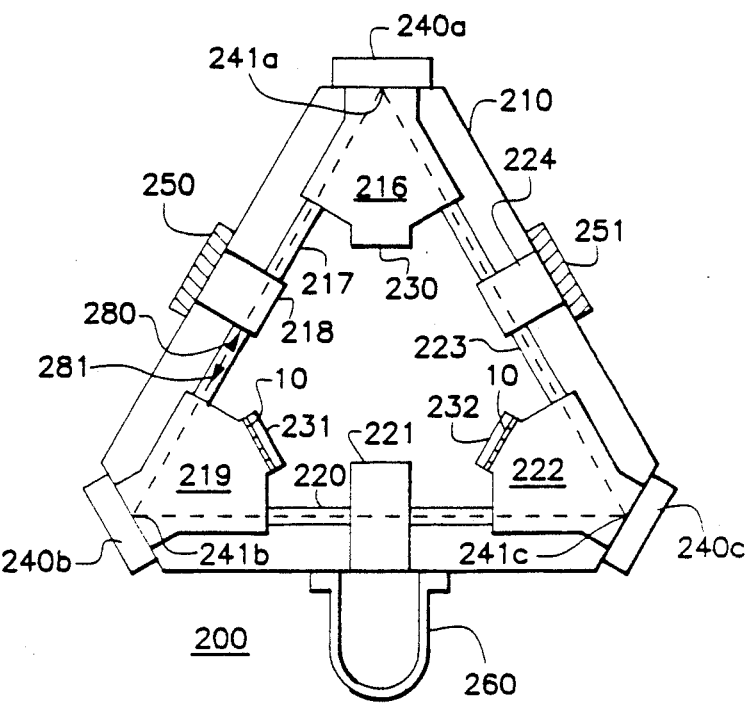
FIG. 2 is a schematic diagram of a ring laser gyro employing a getter assembly of the prior art.

FIG. 2 illustrates a prior art ring laser gyro. Therein, gyro 200 includes a thermally and mechanically stable block 210 such as fused quartz and the like. Block 210 provides a gas discharge cavity including a plurality of interconnected tunnels 217, 220 and 223. Block 210 further includes chambers 216, 218, 219, 221, 222, and 224. Tunnels 217, 220, and 223 form, at least in part, a triangular-shaped optical closed-loop path. Chambers 216, 219, and 222 include gas discharge chamber wall surfaces 230, 231, and 232, respectively. At each of the corners of block 210 are wave reflecting means 240a, 240b, and 40c which respectively provide wave reflecting surfaces 241a, 241b, and 241c. Gyro 200 also includes a first anode 250 in communication with cavity 218 and cavity 217, a second anode 251 in communication with cavity 224 and cavity 223, and a cathode 260 in communication with cavities 221 and 220.

Before all of the aforementioned elements are secured to block 210 with gas-tight seals, getter assemblies 10 of FIG. 1 are positioned in chambers 219 and 222, respectively, by inserting the getter pan assembly into the chambers, and fixing them in position by the snap-ring spring action in manner as aforesaid.

A suitable lasing gas, usually a helium-neon mixture, is then introduced into the gas discharge cavity provided by block 210, and block 210 is then completely sealed with the lasing gas contained therein. Next, getter pans 25 of assemblies 10 are inductively heated by means of external coils (not shown). In turn, getter pan heat is transferred to the getter material 35. The getter pan is heated sufficiently to raise the temperature of the getter material above its flash point. Consequently, getter material 35, after flashing vaporizes and deposits an adhering film of active getter material onto cavity wall portions of chambers 219 and 222, and particularly to wall surfaces 231 and 232. Contaminants in the lasing gas are then absorbed at surfaces 231 and 232 of chambers 219 and 222 due to the active getter material 35 deposited on the chamber walls of the gas discharge cavity.

In order to generate counter-propagating laser beams within laser block 210, a positive potential relative to cathode 260 is applied to anodes 250 and 251, producing an ionization current between anodes 250 and 251 and cathode 260. In this manner, counter-propagating laser beams 280 and 281 are created as is shown and described in U.S. Pat. No. 3,390,606 issued to Podgorski.

It should be emphasized that with the deposition of getter material 35 residing on the walls of chambers 219 and 222, contaminants in the lasing gas are scavenged and thus gyro 200 is provided with an extended lifetime.

Figure 3:
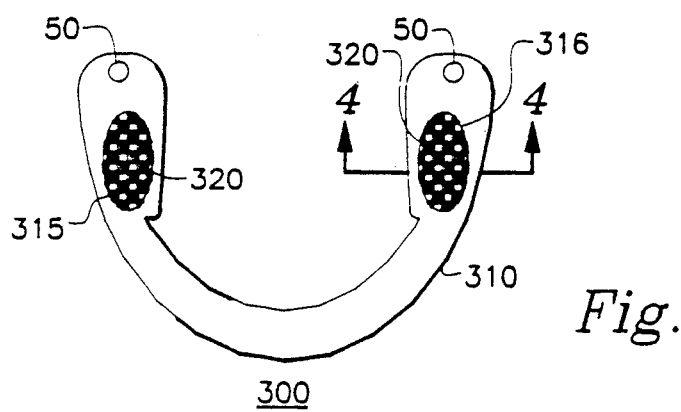
FIG. 3 is a schematic diagram of one embodiment of the present invention.
Figure 4:
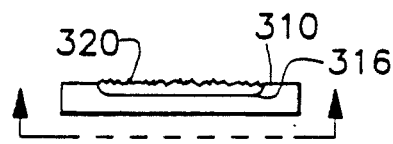
FIG. 4 is a cross-sectional view of FIG. 3.

A getter assembly in accordance with the present invention is illustrated in FIGS. 3 and 4. Therein, getter assembly 300 is comprised of a metallic snap-ring 310 which performs the same function similar to snap-ring 15 of FIG. 1. Snap-ring 310 also may include holes 50 for positioning of getter assembly 300 in the above referred-to manner. Snap-ring 310 of present invention includes depressions 315 and 316 which may be provide by a variety of techniques including stamping, machining, and the like. Getter material 320 is deposited in the depressions 315 and 320.

Figure 5:
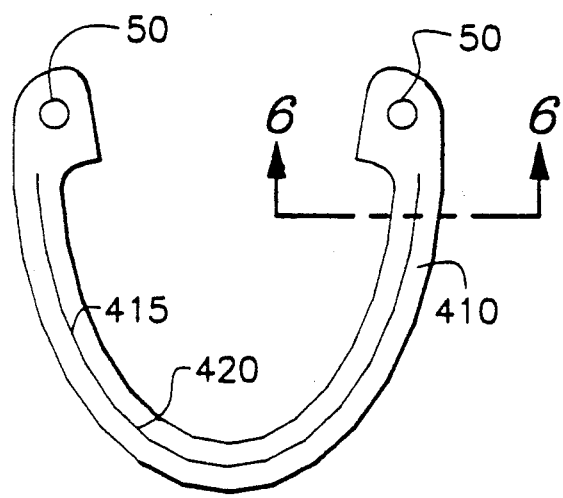
FIG. 5 is a schematic diagram of another embodiment of the present invention.
Figure 6:
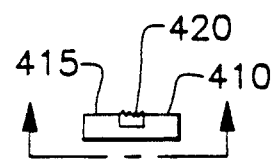
FIG. 6 is a cross-sectional view of FIG. 5.

FIGS. 5 and 6 illustrate another embodiment of the present invention. Therein, getter assembly 400 is comprised of a snap-ring 410, similar to snap-ring 15 of FIG. 1 and snap-ring 310 of FIG. 3. Snap-ring 410 may also include positioning holes 50. Snap-ring 410 is provided with a depression 415 in the form of a channel along the annular shape of the snap-ring 410. Getter material 420 is deposited in depression 415.

In the present invention, it should be understood that the getter material is self-contained within the snap-ring thus avoiding the need for the getter pan of the prior art and the vibration problems associated therewith because of the getter pan extended away from the snap-ring.

It should be appreciated that the getter material in accordance with the present invention may be either deposited within the depression provided by the snap-ring, or alternatively deposited on the surface of the snap-ring. In practice of the present invention, the getter material must be secured to the snap-ring in a manner that avoids loss of any particulate getter material which may fall from the snap-ring during insertion, or vibration of the gas discharge device and the like. Further, the getter material may be a flashless getter material as shown and described in U.S. Pat. No. 4,670,691 issued to Podgorski, or be flashed by means other than inductive heating.

The above referred-to patents are herein incorporated and made a part of the present application.

The embodiments of the invention in which an exclusive property or privilege are claimed are defined as follows:

1. A getter assembly for a gas discharge comprising:
   a snap-ring wherein said snap-ring includes first and second opposite annualar surfaces;
   at least a first depression in a selected portion of said first annualar surface; and
   getter material contained within said depression.

2. The invention as claimed in claim 1 wherein said getter material is an alkaline-earth material.

3. The getter assembly of claim 1 wherein said snap-ring includes first and second end portions, and each of said first and second end portions includes separate depressions for holding said getter material.

4. The getter assembly of claim 1 wherein said snap-ring includes an annular portion, and said depression is in the form of a channel along at least a portion of said annular portion.

5. A Getter Assembly for a gas discharge device comprising:
   a snap-ring having first and second opposite annualar surfaces;
   a Getter Material contained on at least a portion of said first annualar surface.

6. A method for providing a getter in a gas discharge device having a cylindrical chamber, the method comprising:
   depositing getter material on a snap-ring;
   inserting said compressed snap-ring into said cylindrical chamber;
   and releasing the compression of said snap-ring allowing the extremities of said snap ring to provide outward tension against the inner walls of said cylindrical chamber.

* * * * *

UNITED STATES PATENT AND TRADEMARK OFFICE
CERTIFICATE OF CORRECTION

PATENT NO.  : 5,056,102
DATED       : October 8, 1991
INVENTOR(S) : CRAIG A. GALBRECHT It is certified that error appears in the above-identified patent and that said Letters Patent is hereby corrected as shown below:

Column 4, Line 55, after "snap-ring;", insert

--compressing said snap-ring;--.

Signed and Sealed this

Twenty-sixth Day of January, 1993

Attest:

STEPHEN G. KUNIN

*Attesting Officer*    *Acting Commissioner of Patents and Trademarks*